US012443663B2

(12) United States Patent
Nakayama et al.

(10) Patent No.: US 12,443,663 B2
(45) Date of Patent: Oct. 14, 2025

(54) CHUNKING EXECUTION SYSTEM, CHUNKING EXECUTION METHOD, AND INFORMATION STORAGE MEDIUM

(71) Applicant: RAKUTEN GROUP, INC., Tokyo (JP)

(72) Inventors: Yuki Nakayama, Tokyo (JP); Koji Murakami, Eastchester, NY (US)

(73) Assignee: RAKUTEN GROUP, INC., Tokyo (JP)

( * ) Notice: Subject to any disclaimer, the term of this patent is extended or adjusted under 35 U.S.C. 154(b) by 1015 days.

(21) Appl. No.: 17/488,336

(22) Filed: Sep. 29, 2021

(65) Prior Publication Data

US 2023/0096564 A1 Mar. 30, 2023

(51) Int. Cl.
  *G06F 16/90* (2019.01)
  *G06F 16/903* (2019.01)
  *G06N 20/00* (2019.01)

(52) U.S. Cl.
  CPC ....... *G06F 16/90335* (2019.01); *G06N 20/00* (2019.01)

(58) Field of Classification Search
  CPC .......................... G06F 16/90335; G06N 20/00
  See application file for complete search history.

(56) References Cited

U.S. PATENT DOCUMENTS

| 6,775,666 | B1 | 8/2004 | Stumpf et al. |
| 11,151,317 | B1 * | 10/2021 | Singh .................... G06F 40/232 |
| 2018/0268038 | A1 * | 9/2018 | Keyngnaert .......... G06F 16/287 |
| 2018/0329999 | A1 * | 11/2018 | Kale ................... G06F 16/2455 |
| 2021/0350081 | A1 * | 11/2021 | De Peuter .............. G06N 20/20 |
| 2022/0414737 | A1 * | 12/2022 | Wang ................ G06Q 30/0627 |

OTHER PUBLICATIONS

Search Report of Jan. 23, 2023, for corresponding EP Patent Application No. 22189910.7, pp. 1-8.
[Mai+ COLING 16] Khai Mai, Thai-Hoang Pham, Nguyen Minh Trung, Nguyen Tuan Duc, Danushka Bolegala, Ryohei Sasano and Satoshi Sekine: An Empirical Study on Fine-Grained Named Entity Recognition, Proceedings of the 27th International Conference on Computational Linguistics, pp. 711-722, Santa Fe, New Mexico, USA, Aug. 20-26, 2018.

* cited by examiner

*Primary Examiner* — Loc Tran
(74) *Attorney, Agent, or Firm* — HEA Law PLLC

(57) ABSTRACT

A chunking execution system including at least one processor which acquires a search query including at least one token; executes matching with use of dictionary data based on the search query; acquires an output from a learning model on chunking based on the search query; and executes chunking on the search query based on a result of executing the matching and the output from the learning model.

18 Claims, 11 Drawing Sheets

FIG.2
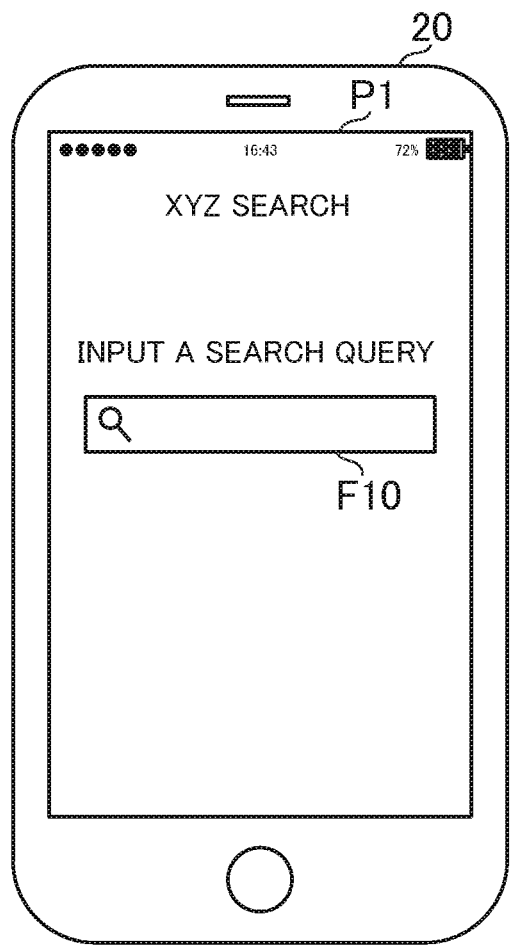
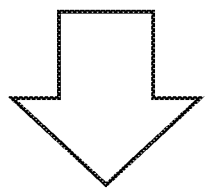
- EXAMPLES OF APPROPRIATE SEARCH QUERY
Tokyo restaurant
U.S.A. championship
- EXAMPLE OF SEARCH QUERY IN WHICH SPACE IS NOT INPUT
  BETWEEN TOKENS
Tokyorestaurant
- EXAMPLE OF SEARCH QUERY IN WHICH SPACE IS INPUT IN
ONE TOKEN
U.S.A. champion ship

FIG.5
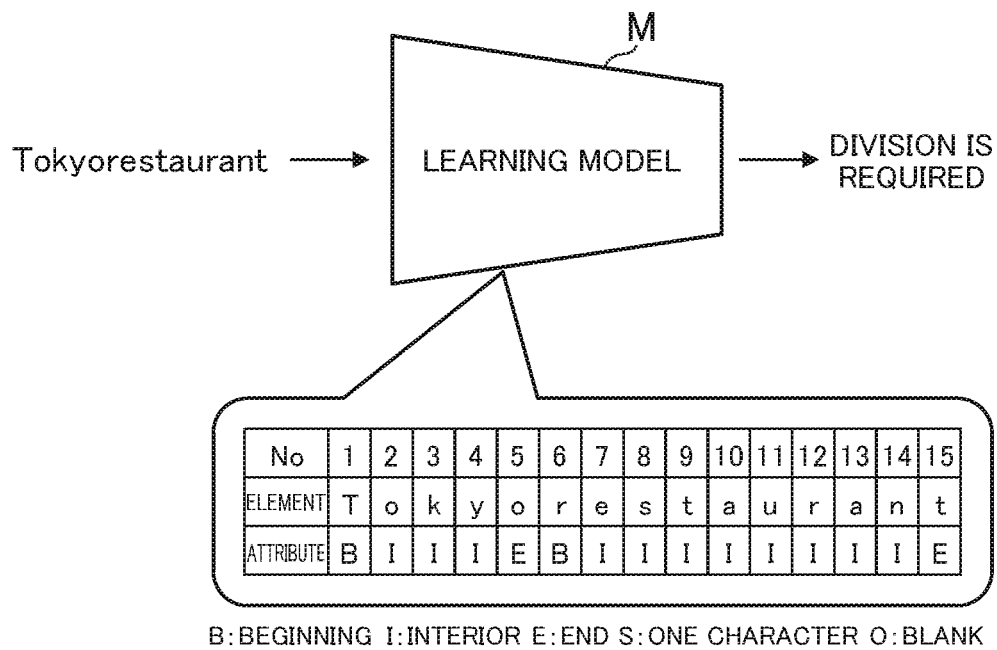
B:BEGINNING I:INTERIOR E:END S:ONE CHARACTER O:BLANK
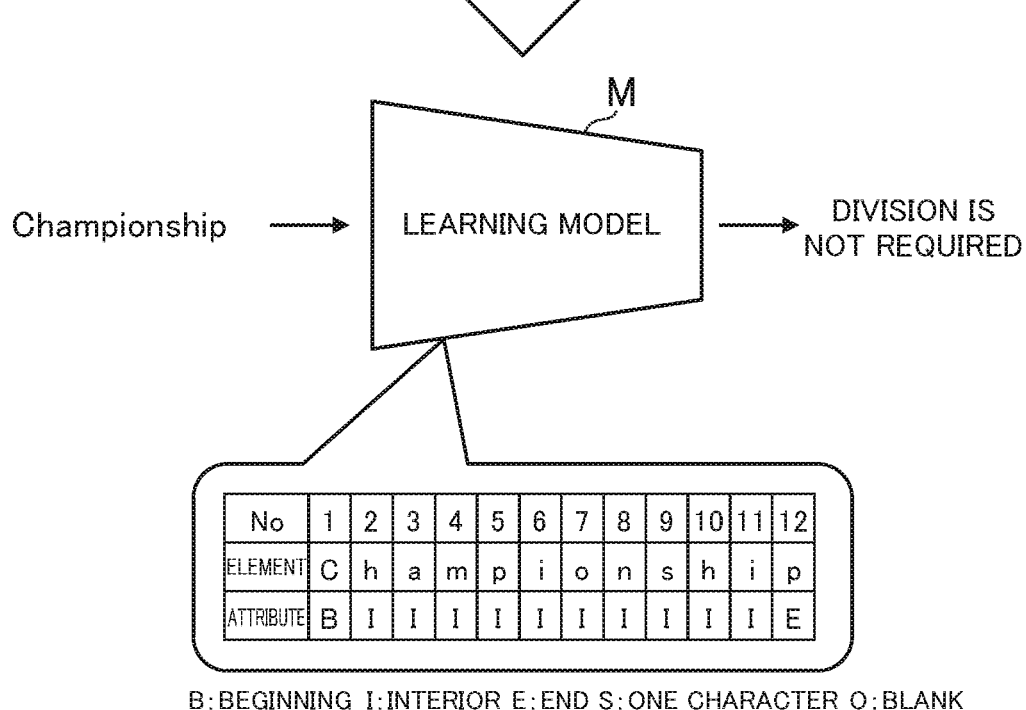
B:BEGINNING I:INTERIOR E:END S:ONE CHARACTER O:BLANK

FIG.8

| SEARCH QUERY/TOKEN/CHARACTER | Japanese | pronunciation | English translation |
|---|---|---|---|
| SEARCH QUERY1 | 吸引器 | kyuinki | aspirator |
| SEARCH QUERY2 | ホワイト 替刃 | howaito kaeba | White spare blade |
| SEARCH QUERY3 | 悪魔の剣 | akumanoturugi | devil's sword |
| SEARCH QUERY4 | ホワイト替刃 | howaitokaeba | White spare blade |
| SEARCH QUERY5 | 悪魔 の 剣 | akuma no turugi | devil's sword |
| TOKEN1 | 吸引器 | kyuinki | aspirator |
| TOKEN2-1 | ホワイト | howaito | White |
| TOKEN2-2 | 替刃 | kaeba | spare blade |
| TOKEN3 | 悪魔の剣 | akumanoturugi | devil's sword |
| TOKEN4 | ホワイト替刃 | howaitokaeba | White spare blade |
| TOKEN5-1 | 悪魔 | akuma | devil |
| TOKEN5-2 | の | no | 's |
| TOKEN5-3 | 剣 | turugi | sword |
| CHARACTER1-1 | 吸 | kyu | - |
| CHARACTER1-2 | 引 | in | - |
| CHARACTER1-3 | 器 | ki | - |
| CHARACTER2-1 | ホ | ho | - |
| CHARACTER2-2 | ワ | wa | - |
| CHARACTER2-3 | イ | i | - |
| CHARACTER2-4 | ト | to | - |
| CHARACTER2-5 | 替 | kae | - |
| CHARACTER2-6 | 刃 | ba | - |
| CHARACTER3-1 | 悪 | aku | - |
| CHARACTER3-2 | 魔 | ma | - |
| CHARACTER3-3 | の | no | - |
| CHARACTER3-4 | 剣 | turugi | - |

CHUNKING EXECUTION SYSTEM, CHUNKING EXECUTION METHOD, AND INFORMATION STORAGE MEDIUM

BACKGROUND OF THE INVENTION

1. Field of the Invention

The present disclosure relates to a chunking execution system, a chunking execution method, and an information storage medium.

2. Description of the Related Art

In the related art, there is known a technology of executing various searches based on search queries that have been input by a user. The search queries can be input freely in principle, and a search query that is not suitable to a search may be input in some cases. For example, even when it is required to input a space between Word A and Word B, there are cases in which no space is input between Word A and Word B. For example, there are also cases in which a space is input between elements (for example, characters or numerals) constituting a word for some reason. Thus, it is required to execute appropriate chunking on the search query.

It is also possible to consider using general technologies of morphological analysis, syntactic analysis, or phrase structure analysis for chunking of the search query. However, those technologies are created assuming general words in principle, and hence even when those technologies are applied to a word input for a particular purpose, for example, the search query, it is probable that sufficient accuracy may not be obtained. To address this problem, in [Mai+COLING16] Khai Mai, Thai-Hoang Pham, Nguyen Minh Trung, Nguyen Tuan Duc, Danushka Bolegala, Ryohei Sasano and Satoshi Sekine: An Empirical Study on Fine-Grained Named Entity Recognition, there is described, as a technology aiming to extract named entities, such as person names and country names, from a sentence, inputting a sentence to a machine learning model, which is capable of referring to dictionary data on the Internet, to extract the named entities.

However, the above-mentioned technology assumes that a sentence having a certain length is input to the machine learning model, and hence cannot be applied to chunking of the search query. If the above-mentioned technology is applied to the search query in some way, the above-mentioned technology is not originally created for the purpose of the chunking of the search query, and a person name or country name is rarely input as a search query, which results in poor chunking accuracy.

SUMMARY OF THE INVENTION

It is an object of the present disclosure to increase chunking accuracy for a search query.

According to at least one embodiment of the present disclosure, there is provided a chunking execution system including at least one processor configured to: acquire a search query including at least one token; execute matching with use of dictionary data based on the search query; acquire an output from a learning model on chunking based on the search query; and execute chunking on the search query based on a result of executing the matching and the output from the learning model.

BRIEF DESCRIPTION OF THE DRAWINGS

FIG. 2 is a diagram for illustrating an outline of a first embodiment of the present disclosure.

FIG. 5 is a diagram for illustrating an example of a learning model.

FIG. 8 is a diagram for illustrating an example of search queries input in Japanese.

DETAILED DESCRIPTION OF THE INVENTION

1. First Embodiment

Description is given of a first embodiment, which is an example of embodiments of a chunking execution system according to the present disclosure.

[1-1. Overall Configuration of Chunking Execution System]

Figure 1:
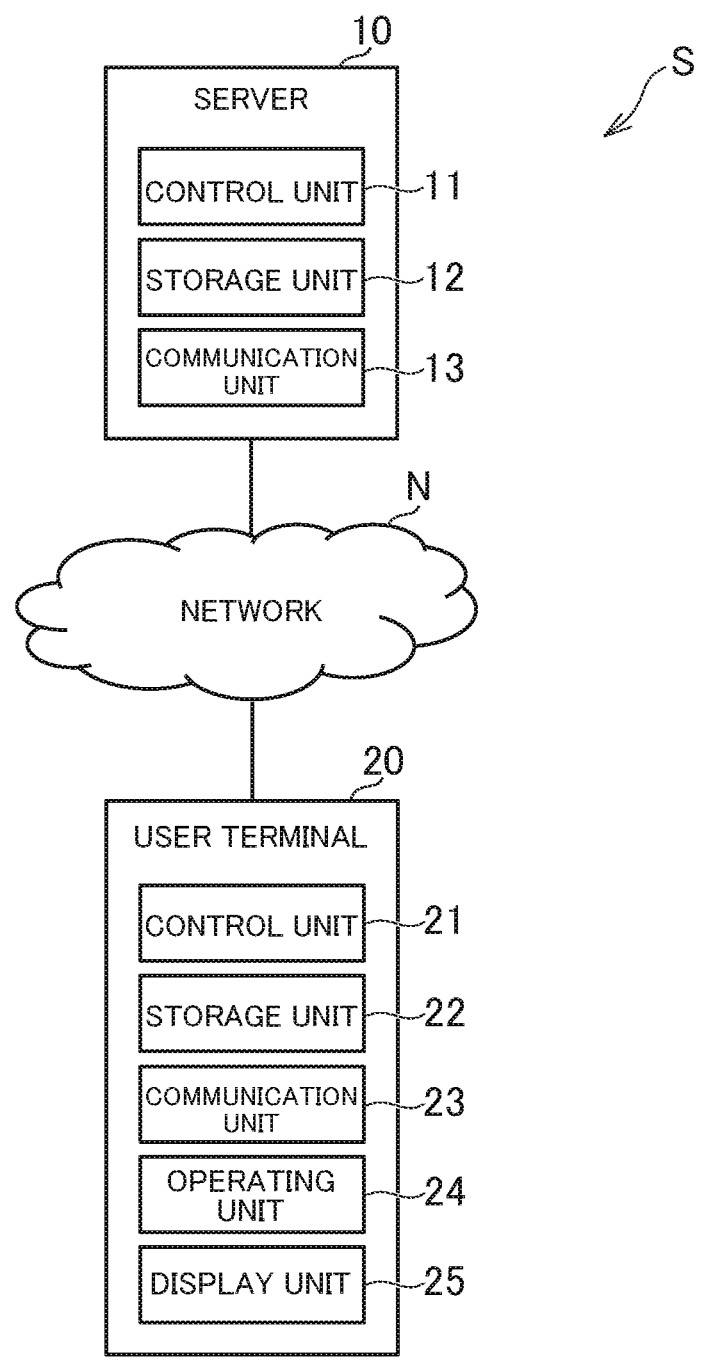
FIG. 1 is a diagram for illustrating an example of an overall configuration of a chunking execution system.

FIG. 1 is a diagram for illustrating an example of an overall configuration of the chunking execution system. A chunking execution system S includes a server 10 and a user terminal 20, which are capable of connecting to a network N. The network N is any network, for example, the Internet or a LAN. It is only required that the chunking execution system S include at least one computer, without limiting to the example of FIG. 1.

The server 10 is a server computer. A control unit 11 includes at least one processor. A storage unit 12 includes a volatile memory, for example, a RAM, and a nonvolatile memory, for example, a hard disk drive. A communication unit 13 includes at least one of a communication interface for wired communication or a communication interface for wireless communication.

The user terminal 20 is a computer of a user. For example, the user terminal 20 is a personal computer, a smartphone, a tablet terminal, or a wearable terminal. Physical configurations of a control unit 21, a storage unit 22, and a communication unit 23 are the same as those of the control unit 11, the storage unit 12, and the communication unit 13, respectively. An operating unit 24 is an input device, for example, a touch panel. A display unit 25 is a liquid crystal display or an organic EL display.

Programs stored in the storage units 12 and 22 may be supplied thereto via the network N. Further, each of the computers may include at least one of a reading unit (e.g., a memory card slot) for reading a computer-readable information storage medium, or an input/output unit (e.g., a USB port) for inputting and outputting data to/from an external device. For example, the program stored in the information storage medium may be supplied through intermediation of at least one of the reading unit or the input/output unit.

[1-2. Outline of First Embodiment]

FIG. 2 is a diagram for illustrating an outline of the first embodiment. In the first embodiment, a case in which the chunking execution system S is applied to a search service in a web site is taken as an example. The chunking execution system S is applicable to various services. An example of application to another service is described later. For example, a user starts a browser or application of the user terminal 20 to access a top page P1 of the search service.

The server 10 can provide various pages, such as the top page P1 and a page of search results, to the user. The user inputs any search query in an input form F10 to use the search service. In the first embodiment, a case in which the search query is input in English is described, but the search query may be input in any language. For example, as in a second embodiment of the present disclosure, which is to be described later, the search query may be input in Japanese. The search query may be input in another language, for example, Chinese, Spanish, French, or Arabic.

The search query is words input by the user at time of searching. A word is at least one character, at least one numeral, at least one symbol, or a combination thereof. A word is also sometimes called a keyword. In the first embodiment, characters, numerals, or symbols constituting a word are described as elements. For example, the elements are alphabet in English, or Kana or Kanji in Japanese. The search query may include search conditions (for example, numerical range or attribute) other than words. The search query input by the user and indices stored in the server 10 are compared to execute searching.

The search query includes at least one token. A token is a unit of words included in the search query. A token includes at least one word. A token may be constituted of one word, or may be constituted of a plurality of words. When a token is constituted of a plurality of words, there may be a space, or any symbol, for example, an underbar or a hyphen, may be placed between the individual words.

For example, it is assumed that the user inputs a search query "The South Mountain" in order to search for items of a fictitious apparel brand "The South Mountain." This search query includes three words: the word "The," the word "South," and the word "Mountain." In order to increase the search accuracy, those three words are better treated as one token than treated as separate tokens, because the three words mean an apparel brand name only when those words are treated as one set. This kind of search query includes one token constituted of three words.

In contrast, for example, it is assumed that the user inputs a search query "Hawaii mountains" in order to search for mountains located in Hawaii. This search query is constituted of two words: the word "Hawaii" and the word "mountains." Those two words are not required to be treated as one set, and are better treated as separate tokens, because each individual word has an independent meaning as opposed to the search query "The South Mountain." This kind of search query includes two tokens each constituted of one word.

It should be noted, however, that it is difficult for the server 10 to determine, at the time of receiving a search query, whether the search query is a token constituted of a plurality of words, or tokens each constituted of one word. Thus, the server 10 assumes, at the time of receiving the search query, each of sections separated by a space to be a token for the moment. For example, in the case of the search query "The South Mountain," the server 10 assumes the search query "The South Mountain" to include three tokens: the token "The," the token "South," and the token "Mountain" for the moment. In the case of the search query "Hawaii mountains," the server 10 assumes the search query "Hawaii mountains" to include two tokens: the token "Hawaii" and the token "mountains" for the moment.

It is only required that the server 10 determine the sections assumed to be tokens from the search query based on a predetermined rule. The sections assumed to be tokens for the moment are not limited to the sections separated by a space. For example, the server 10 may determine the sections assumed to be tokens from the search query based on a symbol that means some separation. For example, the symbol may be a bracket, an underbar, a hyphen, a comma, or a period. Further, the server 10 may determine the sections assumed to be tokens from the search query based on a combination of a plurality of rules.

In the example of FIG. 2, a search query "Tokyo restaurant" includes a token "Tokyo" and a token "restaurant." A search query "U.S.A. championship" includes a token "U.S.A." and a token "championship." The individual tokens of those two search queries are nouns having independent meanings. Those nouns are usually connected as AND conditions or conditions for searching without any problem as long as those nouns have independent meanings. Thus, those two search queries are appropriate as tokens at the time of searching with spaces being inserted at appropriate positions.

A search query "Tokyorestaurant" includes only one token "Tokyorestaurant" without any space. A space is basically required between the noun "Tokyo" and the noun "restaurant," but there is no space between those nouns. For example, when the user inputs only characters to save the trouble of inputting a space, or when the user performs voice input, a plurality of words that otherwise should be divided into a plurality of tokens may form one token. This search query is inappropriate as a token at the time of searching with no space being inserted at an appropriate position.

A search query "U.S.A. champion ship" has a space input between the part "champion" and the part "ship" of a noun "championship." Thus, this search query includes a token "U.S.A.," a token "champion," and a token "ship" as opposed to the search query "U.S.A. championship," which is input appropriately. When the user inputs a space erroneously between the part "champion" and the part "ship," or copies and pastes text from a web site or a document file, a word that otherwise should form one token may be divided into a plurality of tokens. This search query is also inappropriate as tokens at the time of searching with spaces being not inserted at appropriate positions.

To address the above-mentioned problems, in the first embodiment, chunking is executed to form appropriate tokens. The chunking means adjusting what have been assumed to be tokens for the moment to form appropriate tokens. In the first embodiment, description is given of a case in which the chunking includes both combining tokens and dividing a token, but the chunking may mean any one of combining tokens and dividing a token.

The chunking execution system S is intended to increase chunking accuracy for the search query by executing not general chunking by morphological analysis, for example, but new chunking specific to the search service. In the first embodiment, as an example of the chunking specific to the search service, a method in which dictionary data, a collocation score, and a learning model are effectively combined is described. Now, details of the first embodiment are described.

[1-3. Functions Achieved in First Embodiment]

Figure 3:
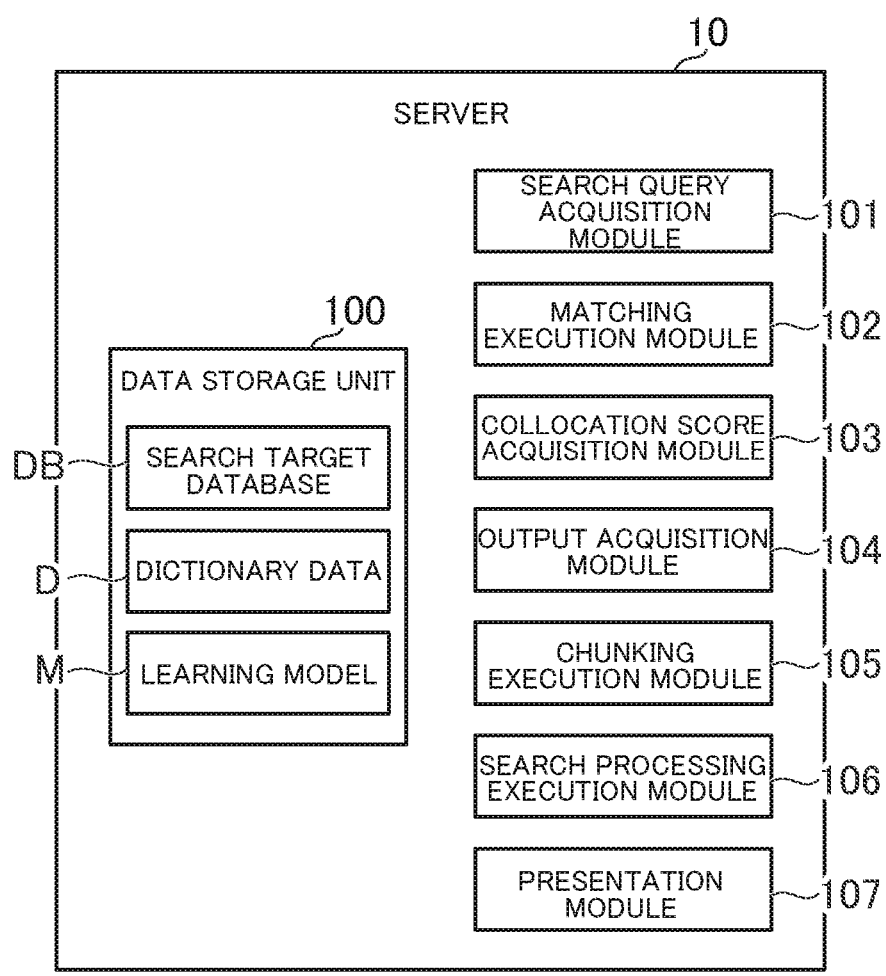
FIG. 3 is a functional block diagram for illustrating an example of functions achieved in the first embodiment.

FIG. 3 is a functional block diagram for illustrating an example of functions achieved in the first embodiment. In the first embodiment, a case in which main functions are achieved by the server 10 is described. A data storage unit 100 is implemented mainly by the storage unit 12. A search query acquisition module 101, a matching execution module 102, a collocation score acquisition module 103, an output acquisition module 104, a chunking execution module 105, a search processing execution module 106, and a presentation module 107 are implemented mainly by the control unit 11.

[Data Storage Unit]

The data storage unit 100 stores data required for chunking. For example, the data storage unit 100 stores a search target database DB, dictionary data D, and a learning model M. As the search target database DB, a database storing data to be searched may be stored. This database stores the indices to be compared with the search query. In the first embodiment, the web site corresponds to a search target, and hence indices including words extracted from various web sites are stored.

Figure 4:
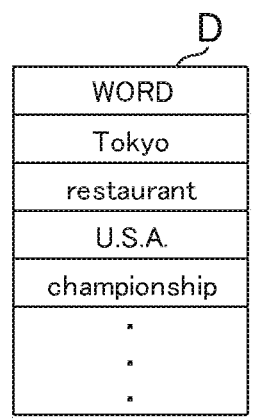
FIG. 4 is a diagram for illustrating an example of dictionary data.

FIG. 4 is a diagram for illustrating an example of the dictionary data D. The dictionary data D is data storing words that are appropriate as tokens at the time of searching. Each word stored in the dictionary data D may be constituted of one word, or may include a plurality of words. For example, when the fictitious apparel brand "The South Mountain" is to be treated as one token, those three words are stored as one word in the dictionary data D. As the dictionary data D per se, various known sets of dictionary data D can be used. For example, the dictionary data D may be generated based on data of an English Dictionary or an Internet encyclopedia. Tokens included in frequently input search queries may be stored in the dictionary data D.

The learning model M is a model using machine learning. As the machine learning perse, various known methods can be used, and for example, supervised learning, semi-supervised learning, or unsupervised learning can be used. For example, the learning model M of supervised learning has been trained on training data that indicates a relationship between a word and chunking necessity for the word. The learning model M estimates chunking necessity for an input word, and outputs a result of the estimation. The learning model M is also sometimes called artificial intelligence (AI). In the first embodiment, CharacterBERT is given as an example of the learning model M. However, another Transformer-based pretrained natural language processing model may be used, or Word2Vec and other such methods may be used. In addition, for example, a model called ELECTRA may be used. BERT and ELECTRA are a type of the above-mentioned model called Transformer.

FIG. 5 is a diagram for illustrating an example of the learning model M. For example, the learning model M estimates division necessity for an input word, and outputs division necessity information on whether it is required to divide the word. The division necessity information is information with which the division necessity can be determined, and indicates, for example, a first value indicating that the word is to be divided, or a second value indicating that the word is not to be divided. The learning model M in the first embodiment outputs the division necessity information based on attributes of the elements (characters, numerals, or symbols) constituting the input word.

An attribute is a position of an element in one word. In the first embodiment, there is exemplified a case in which Attribute B, Attribute I, Attribute E, Attribute S, and Attribute O exist as the attributes. Attribute B means the beginning of a word. Attribute I means the interior of the word. Attribute E means the end of the word. Attribute S means a word formed of a single character. Attribute O means a blank. The learning model M outputs the division necessity information corresponding to the input character string based on those attributes.

In the first embodiment, description is given of a case in which each individual token included in the search query is input to the learning model M, but a plurality of tokens included in the search query may be input to the learning model M at once. The learning model M outputs the division necessity information on whether to divide an input token. FIG. 5 shows outputs of the learning model M that are obtained when a token "Tokyorestaurant" and a token "championship" are input, respectively.

The token "Tokyorestaurant" is constituted of fifteen elements (fifteen alphabets), and hence the learning model M determines fifteen attributes. The attributes of the individual elements are as shown in FIG. 5. The learning model M estimates a portion from an element of the first Attribute B to an element of the subsequent Attribute E ("Tokyo" from the 1st element "T" to the 5th element "o") to be one token. The learning model M estimates a portion from an element of the next Attribute B to an element of the subsequent Attribute E ("restaurant" from the 6th element "r" to the 15th element "t") to be one token.

The learning model M has estimated that the one input token "Tokyorestaurant" includes two tokens, and hence outputs the division necessity information indicating that the token "Tokyorestaurant" is to be divided. The learning model M may output the above-mentioned estimated individual tokens. In this case, the learning model M also executes the division of the token "Tokyorestaurant." The learning model M may divide the token "Tokyorestaurant" into two to output the token "Tokyo" and the token "restaurant."

The token "championship" is constituted of twelve elements (twelve alphabets), and hence the learning model M determines twelve attributes. The attributes of the individual elements are as shown in FIG. 5. The learning model M estimates a portion from an element of the first Attribute B to an element of the subsequent Attribute E ("championship" from the 1st element "c" to the 12th element "p") to be one token. The learning model M has estimated that the one input token "championship" is one token, and hence outputs the division necessity information indicating that the token "championship" is not to be divided.

As described above, the learning model M estimates a portion from an element of Attribute B to an element of the subsequent Attribute E to be one token. The learning model M also estimates an element of Attribute S to be one token. When a plurality of tokens are estimated for one input token (for example, when there are a plurality of pairs of an element of Attribute B and an element of Attribute E), the learning model M outputs the division necessity information indicating that the one input token is to be divided. When one token is estimated for one input token (for example, when there is only one pair of an element of Attribute B and an element of Attribute E), the learning model outputs the division necessity information indicating that the one input token is not to be divided.

When a plurality of tokens are estimated for one input token, the learning model M may divide the one input token and output a result of the division. For example, the learning model M divides the input token so that an element of Attribute B to an element of the subsequent Attribute E form one token, and outputs the divided tokens. The learning model M divides the input token so that an element of Attribute S forms one token, and outputs the divided tokens. The chunking execution module 105, which is to be described layer, may execute the chunking by inputting a token to the learning model M and acquiring the divided tokens, which are output from the learning model M.

[Search Query Acquisition Module]

The search query acquisition module 101 acquires a search query including at least one token. In the first embodiment, the user terminal 20 transmits the search query, which is input by the user, to the server 10, and hence the search query acquisition module 101 acquires the search query from the user terminal 20. The search query may be stored in advance in the data storage unit 100. In this case, the search query acquisition module 101 acquires the search query from the data storage unit 100. The search query acquisition module 101 may acquire the search query from another computer than the server 10 or the user terminal 20.

[Matching Execution Module]

The matching execution module 102 executes matching with use of the dictionary data D based on the search query acquired by the search query acquisition module 101. The matching means comparing the search query and the words stored in the dictionary data D. In the first embodiment, description is given of a case in which comparing each individual token included in the search query and the words stored in the dictionary data D corresponds to the matching, but comparing a plurality of tokens included in the search query and the words stored in the dictionary data D may correspond to the matching.

For example, the matching execution module 102 executes the matching by determining whether each individual token included in the search query matches a word stored in the dictionary data D. In other words, the matching execution module 102 determines whether a word that matches each individual token exists in the dictionary data D. In the first embodiment, description is given of a case in which a full match is determined, but a partial match may be determined. The partial match may be any one of a forward match, a middle match, or a backward match.

It is assumed that the search queries are the example of FIG. 2, and that the dictionary data D is the example of FIG. 4. The matching execution module 102 executes the matching by determining whether each of the token "Tokyo" and the token "restaurant" in the search query "Tokyo restaurant" fully matches a word stored in the dictionary data D. The dictionary data D stores a word "Tokyo" and a word "restaurant," and hence the matching execution module 102 determines that all of the tokens included in the search query exist in the dictionary data D.

The matching execution module 102 executes the matching by determining whether each of the token "U.S.A." and the token "championship" in the search query "U.S.A. championship" fully matches a word stored in the dictionary data D. The dictionary data D stores a word "U.S.A." and a word "championship," and hence the matching execution module 102 determines that all of the tokens included in the search query exist in the dictionary data D.

The matching execution module 102 executes the matching by determining whether each of the token "Tokyorestaurant" in the search query "Tokyorestaurant" fully matches a word stored in the dictionary data D. The token "Tokyorestaurant," and the word "Tokyo" and the word "restaurant" in the dictionary data D partially match but do not fully match, and hence the matching execution module 102 determines that the token does not exist in the dictionary data D.

The matching execution module 102 executes the matching by determining whether each of the token "U.S.A.," the token "champion," and the token "ship" in the search query "U.S.A. champion ship" fully matches a word in the dictionary data D. The dictionary data D stores a word "U.S.A.," and hence the matching execution module 102 determines that the token "U.S.A." exists in the dictionary data D. The token "champion" and the token "ship" partially match but do not fully match a word "championship" in the dictionary data D, and hence the matching execution module 102 determines that those tokens do not exist in the dictionary data D.

In the first embodiment, the matching execution module 102 executes the matching based on the search query before the processing of the learning model M is executed. In other words, the matching execution module 102 executes matching based on a search query before tokens of the search query are input to the learning model M. In the first embodiment, description is given of a case in which tokens that have been determined to exist in the dictionary data D in the matching are not input to the learning model M, but all tokens of the search query may be input to the learning model M. In other words, the tokens that have been determined to exist in the dictionary data D may be input to the learning model M.

[Collocation Score Acquisition Module]

The collocation score acquisition module 103 acquires a collocation score based on the search query acquired by the search query acquisition module 101. The collocation score is information on relevance of a plurality of words. In other words, the collocation score is information on collocation likelihood of the plurality of words. For example, a plurality of words that are more likely to co-occur have a higher value of the collocation score. In the first embodiment, description is given of a case in which the collocation score is expressed by a numerical value, but the collocation score may be expressed by a character or a symbol. For example, a higher numerical value of a collocation score of a word and another word means higher relevance of those words. The collocation score is preferably mutual information (MI). In one embodiment, the collocation score may be a t-score, a z-score, a log-likelihood, the Dice coefficient, MI3, or collocation likelihood quantified based on a known method instead of the mutual information. The log-likelihood, the t-score, or the like is an example of a collocation score using a hypothesis testing method. In contrast, the mutual information, MI3, or the like is an example of a collocation score using information theory. For example, a collocation score may be a calculation method based on a frequency of co-occurrence, a significance of co-occurrence, an effect size, or a combination thereof.

In the first embodiment, when a search query includes a plurality of tokens, the collocation score acquisition module 103 acquires a collocation score of a token and the subsequent token. When a search query includes only one token, there is no relevance between tokens, and hence the collocation score acquisition module 103 does not acquire a collocation score. As a method of acquiring the collocation score per se, various known methods can be used. For example, the collocation score acquisition module 103 may acquire the collocation score based on a method called "pointwise mutual information (PMI)" or "strength of association (SOA)."

In the case of the example of FIG. 2, the search query "U.S.A. champion ship" includes the token "U.S.A.," the token "champion," and the token "ship." The collocation score acquisition module 103 acquires a collocation score of a low numerical value indicating low relevance as a collocation score of the token "U.S.A." and the token "champion." In contrast, the collocation score acquisition module 103 acquires a collocation score of a numerical value indicating high relevance as a collocation score of the token "champion" and the token "ship."

In regard to the search query "Tokyo restaurant" and the search query "U.S.A. championship," relevance of individual tokens is low, and hence the collocation score acquisition module 103 acquires a collocation score of a low numerical value indicating low relevance as a collocation score of each of the tokens. The search query "Tokyorestaurant" includes only one token, and hence a collocation score is not acquired. The collocation score may indicate not relevance between tokens but relevance of words or elements included in a token. In this case, the collocation score acquisition module 103 may acquire a collocation score of a word or element and a subsequent word or element.

[Output Acquisition Module]

The output acquisition module 104 acquires, based on the search query acquired by the search query acquisition module 101, an output from the learning model M on chunking. In the first embodiment, description is given of a case in which tokens that have been determined to exist in the dictionary data D by the matching execution module 102 are not input to the learning model M, but the output acquisition module 104 may input all tokens in the search query to the learning model M irrespective of the matching results. Alternatively, for example, tokens having a collocation score of a threshold value or more may not be input to the learning model M.

In the first embodiment, the output acquisition module 104 acquires the output from the learning model M based on the search query after the matching has been executed. For example, the output acquisition module 104 inputs, to the learning model M, tokens of a search query that have been determined not to exist in the dictionary data D in the matching. As described above, the learning model M in the first embodiment outputs the division necessity information on whether to divide at least one token included in the search query. The details of the processing of the learning model M have been described above.

[Chunking Execution Module]

The chunking execution module 105 executes chunking on the search query based on the results of executing the matching and the output from the learning model M. In the first embodiment, the collocation score is also used, and hence the chunking execution module 105 executes the chunking on the search query based on the results of executing the matching, the output from the learning model M, and the collocation score. The phrase "chunking on the search query" refers to dividing one token included in the search query into a plurality of tokens, or combining a plurality of tokens included in the search query into one token.

For example, the chunking execution module 105 determines not to divide or combine the tokens that have been determined to exist in the dictionary data D in the matching. In the first embodiment, the chunking execution module 105 extracts the tokens that have been determined to exist in the dictionary data D from the search query. When the tokens are extracted from the search query, the chunking execution module 105 subjects the remaining tokens to the processing of the learning model M and the processing of the collocation score acquisition module 103.

A token that has been determined not to exist in the dictionary data D is divided depending on the output from the learning model M. In the first embodiment, the learning model M outputs the division necessity information, and hence the chunking execution module 105 determines whether to divide the token included in the search query based on the division necessity information. For example, the chunking execution module 105 determines to divide a token for which division necessity information output from the learning model M indicates that division is required. The chunking execution module 105 determines not to divide a token for which the division necessity information output from the learning model M indicates that division is not required.

For example, tokens that have been determined not to exist in the dictionary data D are combined depending on a collocation score. The chunking execution module 105 determines to combine tokens for which the collocation score is the threshold value or more. The chunking execution module 105 determines not to combine tokens for which the collocation score is less than the threshold value.

In the case of the example of FIG. 2, the matching results that indicate that the token "Tokyo" and the token "restaurant" in the search query "Tokyo restaurant" exist in the dictionary data D are acquired, and hence the chunking execution module 105 does not divide or combine the token "Tokyo" and the token "restaurant."

The matching results that indicate that the token "U.S.A." and the token "championship" in the search query "U.S.A. championship" exist in the dictionary data D are acquired, and hence the chunking execution module 105 does not divide or combine the token "U.S.A." and the token "championship."

The division necessity information indicating that the token "Tokyorestaurant" in the search query "Tokyorestaurant" is to be divided is output from the learning model M, and hence the chunking execution module 105 divides the token "Tokyorestaurant" into a token "Tokyo" and a token "restaurant." For example, the chunking execution module 105 may perform the division based on the dictionary data D. The dictionary data D stores the word "Tokyo" and the word "restaurant," and hence when determining that the token "Tokyorestaurant" for which division is required and those words partially match, the chunking execution module 105 divides the token into those words.

The matching result that indicates that, of the token "U.S.A.," the token "champion," and the token "ship" in the search query "U.S.A. champion ship," the token "U.S.A." exists in the dictionary data D is acquired, and hence the chunking execution module 105 does not divide or combine the token "U.S.A." A collocation score of the token "champion" and the token "ship" is the threshold value or more, and hence the chunking execution module 105 combines the token "champion" and the token "ship" into one token "championship."

[Search Processing Execution Module]

The search processing execution module 106 executes search processing based on the search target database DB and a result of executing the chunking. The search processing execution module 106 executes the search processing by comparing the indices stored in the search target database DB and the token acquired in the chunking by the chunking execution module 105. As the search processing per se, various known methods may be used. For example, when a plurality of tokens are acquired by the chunking execution module 105, the search processing execution module 106 executes the search processing by connecting the plurality of tokens as OR conditions. In the case of the example of FIG. 2, the search query "Tokyo restaurant" and the search query "U.S.A. championship" are not chunked, and hence the search processing execution module 106 executes the search processing based directly on those search queries.

In contrast, the search query "Tokyorestaurant" is divided into the token "Tokyo" and the token "restaurant" by the chunking execution module 105. Thus, the search processing execution module 106 executes the search processing based on a search query "Tokyo restaurant" obtained as a result of chunking so as to be divided into those two tokens (to put a space therebetween). As to the search query "U.S.A. champion ship," the token "U.S.A." is not chunked, but the token "champion" and the token "ship" are combined into "championship" by the chunking execution module 105. Thus, the search processing execution module 106 executes the search processing based on a search query "U.S.A. championship" obtained as a result of chunking so that those two tokens are combined into one (so as to leave no space therebetween).

[Presentation Module]

The presentation module 107 presents a result of executing the search processing to the user who has input the search query. In the first embodiment, description is given of a case in which the execution result is visually presented by using an image, but the execution result may be presented audibly by using a voice. The result of executing the search processing is a list of indices that have been hit in the search. For example, the presentation module 107 generates display data (for example, HTML data) of a screen including the result of executing the search processing, and transmits the display data to the user terminal 20.

[1-4. Processing Executed in First Embodiment]

Figure 6:
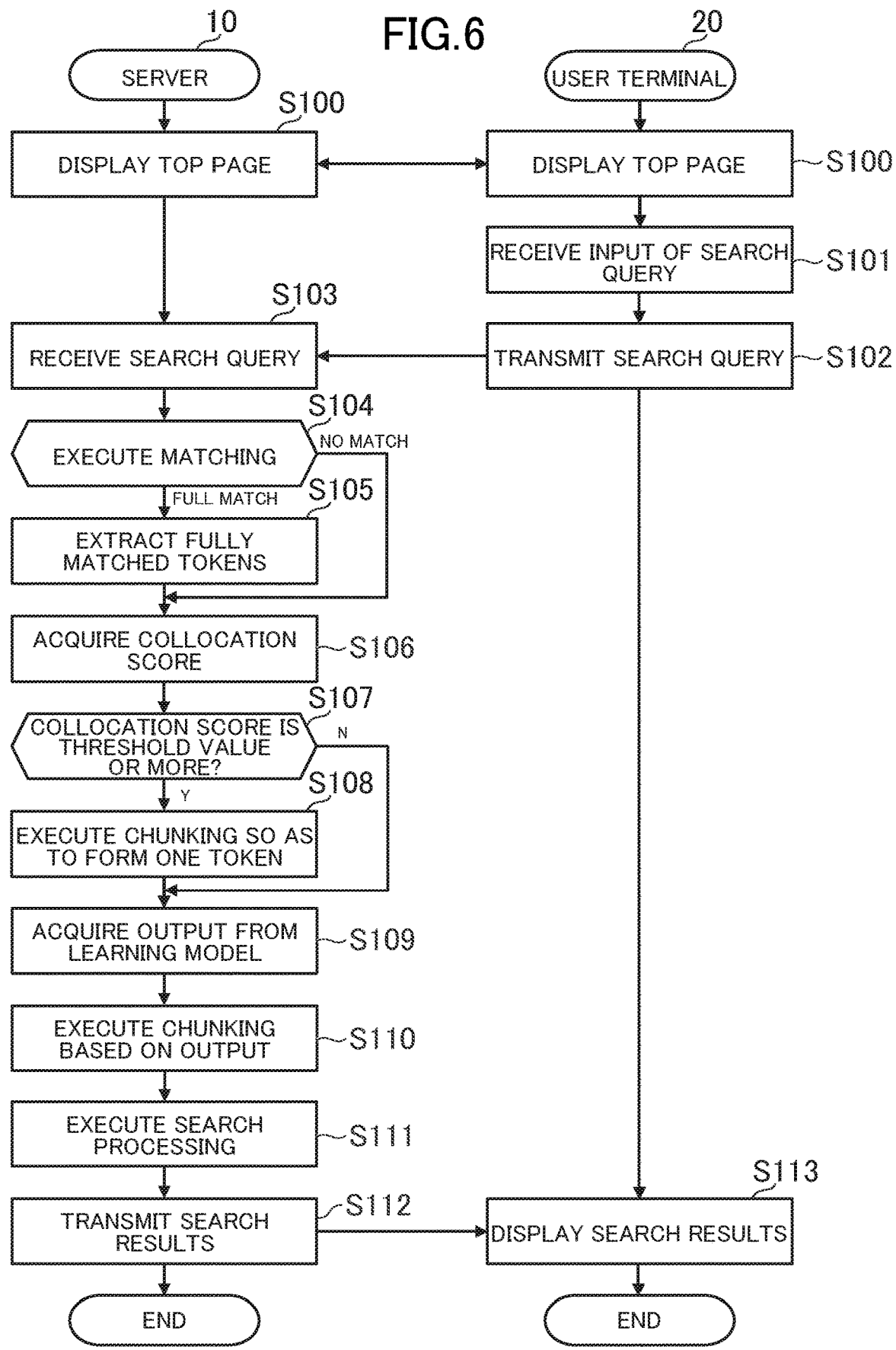
FIG. 6 is a flow chart for illustrating an example of processing executed in the first embodiment.

FIG. 6 is a flow chart for illustrating an example of processing executed in the first embodiment. This processing is executed by the control units 11 and 21 operating in accordance with programs stored in the storage units 12 and 22, respectively.

When the user selects a link to the top page P1 or the like, the user terminal 20 accesses the server 10 to display the top page P1 of the search service on the display unit 25 (Step S100). The user terminal 20 receives an input of a search query on the input form F10 based on an operation of the user from the operating unit 24 (Step S101). The user terminal 20 transmits, to the server 10, the search query input by the user (Step S102).

When the search query is received from the user terminal 20 (Step S103), the server 10 executes matching based on the dictionary data D (Step S104). When a token in the search query and a word stored in the dictionary data D fully match (Step S104: full match), the server 10 extracts, from the search query, the token that has fully matched with the word stored in the dictionary data D (Step S105). When a token in the search query and a word stored in the dictionary data D do not fully match (Step S104: no match), the processing step of Step S105 is not executed.

In the case of the example of FIG. 2, the token "Tokyo" and the token "restaurant" in the search query "Tokyo restaurant" are extracted in the processing step of Step S105. The search query is left with no token, and hence is not subjected to processing steps of Step S106 to Step S110, and the process proceeds to Step S111. Similarly from the search query "U.S.A. championship," the token "U.S.A." and the token "championship" are extracted in the processing step of Step S105. This search query is not subjected to the processing steps of Step S106 to Step S110, and the process proceeds to Step S111.

In contrast, no token is extracted from the search query "Tokyorestaurant" in the processing step of Step S105. This search query is subjected to the processing step of Step S106. The token "U.S.A." is extracted from the search query "U.S.A. champion ship" in the processing step of Step S105.

The token "champion" and the token "ship" in this search query are subjected to the processing step of Step S106. The token "U.S.A." is not subjected to the processing steps of Step S106 to Step S110.

The server 10 acquires a collocation score based on the search query (Step S106), and determines whether the collocation score is the threshold value or more (Step S107). When there is only one token, the processing steps of Step S106 and Step S107 are not executed. In the case of the example of FIG. 2, the search query "Tokyorestaurant" includes only one token, and hence is not subjected to the processing step of Step S106. The search query "U.S.A. champion ship" is left with the token "champion" and the token "ship," and hence is subjected to the processing step of Step S106.

When it is determined that the collocation score is the threshold value or more (Step S107: Y), the server 10 extracts a plurality of tokens for which the collocation score is the threshold value or more from the search query, and executes the chunking so that the plurality of tokens for which the collocation score is the threshold value or more form one token (Step S108). In the case of the example of FIG. 2, as to the search query "U.S.A. champion ship," the token "champion" and the token "ship" have the collocation score of the threshold value or more, and hence are extracted in the processing step of Step S107. When it is not determined that the collocation score is the threshold value or more (Step S107: N), the processing step of Step S108 is not executed.

The server 10 acquires an output from the learning model M based on the search query (Step S109). In the case of the example of FIG. 2, in Step S109, when the search query "Tokyorestaurant" is input to the learning model M, the server 10 acquires the division necessity information indicating that the search query is to be divided, which is output from the learning model M. The server 10 executes the chunking based on the output from the learning model M (Step S110). In Step S110, the server 10 executes the chunking on a token for which the division necessity information indicates that division is required so that words partially matched with the dictionary data D are divided into separate tokens. The server 10 does not divide a token for which the division necessity information indicates that division is not required.

The server 10 executes the search processing based on the result of executing the chunking (Step S111), and transmits search results to the user terminal 20 (Step S112). When data of the search results is received from the server 10, the user terminal 20 displays the search results on the display unit 25 (Step S113), and the processing ends.

According to the chunking execution system S of the first embodiment, the chunking on the search query is executed based on the result of executing the matching with use of the dictionary data D, and the output from the learning model M, and hence chunking accuracy for a matched search query is increased. For example, as compared to a case in which only the matching is used or a case in which only the learning model M is used, a probability that tokens included in the search query can be formed into appropriate tokens is increased, and the chunking accuracy is increased.

Further, the chunking execution system S executes the matching based on the search query before processing of the learning model M is executed, and acquires an output from the learning model M based on the search query on which the matching has been executed. As a result, for example, tokens that have failed to be accurately chunked in the matching can be chunked with use of the learning model M, and hence the chunking accuracy for the search query is increased.

Further, the chunking execution system S executes the chunking based on the result of executing the matching, the output from the learning model M, and the collocation score, and hence the chunking accuracy for the search query is effectively increased. For example, as compared to the case in which only the matching is used, the case in which only the learning model M is used, or the case in which only the collocation score is used, the probability that tokens included in the search query can be formed into appropriate tokens is increased, and hence the chunking accuracy is increased.

Further, in the chunking execution system S, the learning model M determines whether to divide a token included in the search query, based on the division necessity information regarding whether to divide at least one token included in the search query. As a result, it is possible to determine whether to actually divide the token with use of the dictionary data D, for example, and hence the chunking accuracy for the search query is effectively increased.

Further, the chunking execution system. S executes the search processing based on the result of executing the chunking, and presents the result of executing the search processing to the user who has input the search query. As a result, the search processing based on the chunked tokens can be executed, and hence accuracy of the search processing is increased.

2. Second Embodiment

Next, description is given of the second embodiment, which is another embodiment of the chunking execution system S. In the first embodiment, the case in which an English search query is input in the search service of the web site is taken as an example for description. The chunking execution system S is applicable to a search query in any language in any service, and the service and the language are not limited to the example of the first embodiment. In the second embodiment, a case in which a Japanese search query is input in an online shopping service is taken as an example. Description of points similar to those of the first embodiment is omitted.

[2-1. Outline of Second Embodiment]

Figure 7:
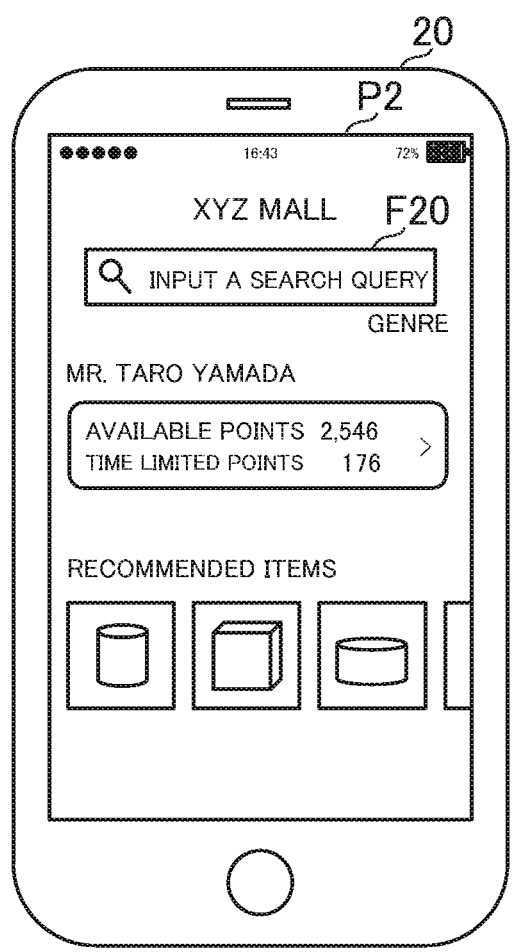
FIG. 7 is a diagram for illustrating an outline of a second embodiment of the present disclosure.

FIG. 7 is a diagram for illustrating an outline of the second embodiment. For example, the user starts the browser or application of the user terminal 20 to access a top page P2 of the online shopping service. In the second embodiment, it is assumed that the server 10 can provide various pages including the top page of the online shopping service to the user. The user inputs any search query in an input form F20 to search for a desired item. The user may specify, as one of search queries, various attributes, for example, a genre, in or out of stock, a color, a size, a production area, or a manufacturer. The search query is input at the time of searching in the online shopping service.

FIG. 8 is a diagram for illustrating an example of search queries input in Japanese. In the second embodiment, it is assumed that Japanese Search Queries 1 to 5 as shown in FIG. 8 are input. In FIG. 8, for reference in U.S. patent application relating to the present disclosure, pronunciations and English translations of Search Queries 1 to 5 are provided. Token 1 is a token included in Search Query 1. Tokens 2-1 and 2-2 are tokens included in Search Query 2. Token 3 is a token included in Search Query 3. Token 4 is a token included in Search Query 4. Tokens 5-1 to 5-3 are tokens included in Search Query 5.

Characters 1-1 to 1-3 are characters included in Search Query 1. Characters 2-1 to 2-6 are characters included in Search Queries 2 and 4. Token 2-1 is constituted of Characters 2-1 to 2-4. Token 2-2 is constituted of Characters 2-5 and 2-6. Token 4 is constituted of Characters 2-1 to 2-6. Characters 3-1 to 3-4 are characters included in Search Queries 3 and 5. Token 3 is constituted of Characters 3-1 to 3-4. Token 5-1 is constituted of Characters 3-1 and 3-2. Token 5-2 is constituted of Character 3-3. Token 5-3 is constituted of Character 3-4.

Token 1 indicates a type of an item. Token 2-1 indicates a fictitious item manufacturer. Token 2-2 indicates a type of an item. Token 3 indicates a title of a fictitious anime. Token 4 indicates a character string obtained when no space is input between Token 2-1 and Token 2-2. Token 5-1 is a part of Characters 3-1 and 3-2 of Token 3. Token 5-1 is a noun. Token 5-2 is a particle. Token 5-3 is a noun.

It is not required to divide Search Query 1 because the type of the item is appropriately input. It is not required to divide or combine Search Query 2 because a space is appropriately placed between the item manufacturer and the type of the item. It is not required to divide Search Query 3 because the title of the anime is appropriately input. It is required to divide Search Query 4 because the item manufacturer and the type of the item are continuous without a space placed therebetween. It is required to combine Search Query 5 because unnecessary spaces are placed in the title of the anime.

In the second embodiment, chunking is executed so that Search Query 4 and Search Query 5 form appropriate tokens, respectively. A flow of the chunking is similar to that of the first embodiment, but details of individual processes are different from those of the first embodiment. For example, in the second embodiment, chunking is executed by using matching with use of a plurality of sets of the dictionary data D and a plurality of collocation scores. Now, details of the second embodiment are described.

[2-2. Functions Achieved in Second Embodiment]

Figure 9:
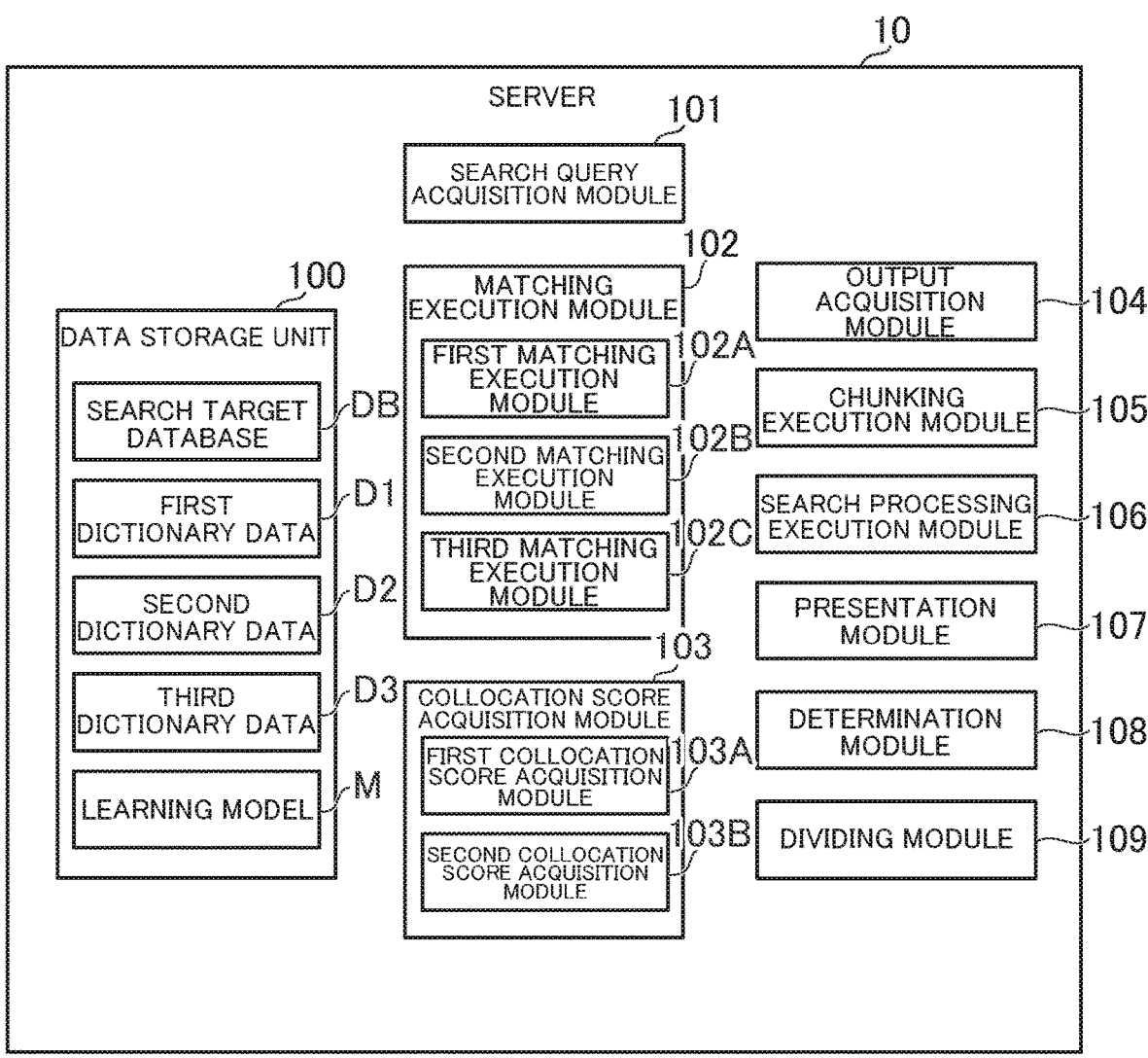
FIG. 9 is a functional block diagram for illustrating an example of functions achieved in the second embodiment.

FIG. 9 is a functional block diagram for illustrating an example of functions achieved in the second embodiment. The server 10 has functions common to those of the first embodiment, but is different in some functions. A determination module 108 and a dividing module 109 are implemented mainly by the control unit 11.

[Data Storage Unit]

A data storage unit 100 is substantially the same as that of the first embodiment, but is different from that of the first embodiment in details of data stored in the data storage unit 100. For example, the search target database DB includes information on items for sale in an online shopping mall. For example, the search target database DB stores information, for example, a store ID with which a store that sells the items can be identified, item IDs with which individual items can be identified, indices including keywords extracted for searching the items, attributes, such as an item title and an item genre, detailed descriptions of the items, images of the items, and prices of the items. The item title is a character string indicating a brief description of an item. The item title may be a row of words. The item titles and the detailed descriptions of the items, for example, are input by a person in charge of a store.

Further, the data storage unit 100 is different from that of the first embodiment in storing the plurality of sets of the dictionary data D. The plurality of sets of the dictionary data D include first dictionary data D1, second dictionary data D2, and third dictionary data D3. A data structure of each of the first dictionary data D1, the second dictionary data D2, and the third dictionary data D3 is similar to that of the dictionary data D described in the first embodiment, and hence illustration thereof is omitted. The first dictionary data D1, the second dictionary data D2, and the third dictionary data D3 are hereinafter simply described as the dictionary data D when no distinction is made thereamong. The data storage unit 100 may store two sets or four or more sets of the dictionary data D, or store only one set of the dictionary data D as in the first embodiment.

For example, the first dictionary data D1 is generated by an administrator of the online shopping mall. Words stored in the first dictionary data D1 are tokens included in search queries frequently input in the online shopping mall. Words stored in the second dictionary data D2 are words posted in an Internet encyclopedia. The third dictionary data D3 is generated based on item titles in item pages of the online shopping mall.

As words in the third dictionary data D3, the item titles may be stored as they are, or nouns included in the item titles may be stored. As a method of extracting the nouns from the item titles, known morphological analysis, for example, may be used. In the second embodiment, description is given of a case in which, for each item genre, the third dictionary data D3 is generated based on item titles of items in the item genre, but the third dictionary data D3 may be generated without particular regard to the item genre.

[Search Query Acquisition Module]

A search query acquisition module 101 is similar to that of the first embodiment.

[Matching Execution Module]

A matching execution module 102 executes matching with use of the plurality of sets of the dictionary data D. Matching with each individual set of the dictionary data D is as described in the first embodiment. In the second embodiment, description is given of a case in which the matching execution module 102 includes a first matching execution module 102A, a second matching execution module 102B, and a third matching execution module 102C, but the matching execution module 102 may include only the first matching execution module 102A and the second matching execution module 102B. Alternatively, for example, the matching execution module 102 may include only the first matching execution module 102A and the third matching execution module 102C, or include only the second matching execution module 102B and the third matching execution module 102C.

In the second embodiment, description is given of a case in which matching is executed in the following order: the first matching execution module 102A, the second matching execution module 102B, and the third matching execution module 102C, but the order of processing may be any order. For example, the matching may be executed in the following order: the first matching execution module 102A, the third matching execution module 102C, and the second matching execution module 102B, the following order: the second matching execution module 102B, the first matching execution module 102A, and the third matching execution module 102C, or another order.

For example, when a search query includes a plurality of tokens, the first matching execution module 102A executes a first matching based on the plurality of tokens included in the search query and the first dictionary data D1. The first matching is matching with use of the first dictionary data D1. The first matching is different from the matching described in the first embodiment in that the first dictionary data D1 is used, but specific processing per se of the first matching is similar to the matching described in the first embodiment. As described in the matching in the first embodiment, a full match with the first dictionary data D1 is required also in the first matching, but a partial match may be required. This also applies to a second matching and a third matching.

The second matching execution module 102B executes, when some tokens of the plurality of tokens have found hits in the first dictionary data D1, a second matching based on tokens of the plurality of tokens that have failed in finding hits in the first dictionary data D1, and on the second dictionary data D2. Of the tokens included in the search query, tokens that have not fully matched in the first matching are subjected to the second matching. The second matching is different from the matching described in the first embodiment in that the second dictionary data D2 is used, and in that the tokens that have not fully matched in the first matching are subjected to the second matching, but specific processing per se of the second matching is similar to the matching described in the first embodiment.

In the second embodiment, the first dictionary data D1 has a higher matching rate in the past than that of the second dictionary data D2, and the first matching based on the first dictionary data D1 having the relatively higher matching rate in the past is executed prior to the second matching based on the second dictionary data D2 having the relatively lower matching rate in the past. The matching rate in the past is a statistical accuracy rate. For example, a hit rate obtained when tokens included in appropriate search queries that have been input in the past are subjected to matching corresponds to an accuracy rate, and to the matching rate in the past.

It is assumed that the matching rate in the past is calculated in advance by an administrator of the chunking execution system S. For example, the administrator prepares a large number of pairs of a search query input in the past and an appropriate token corresponding to the search query. The administrator causes a computer he or she operates to match those pairs with the dictionary data D and count the number of full matches. The computer calculates the matching rate in the past by dividing the counted number of full matches by a total number of pairs. As a method of calculating the matching rate in the past per se, various known methods can be used without limiting to the above-mentioned example.

In the second embodiment, it is assumed that the dictionary data D generated by the administrator of the online shopping service has a higher matching rate in the past than the dictionary data D generated based on a general encyclopedia. Thus, the dictionary data D generated by the administrator of the online shopping service is used as the first dictionary data D1. The dictionary data D generated based on the general encyclopedia is used as the second dictionary data D2.

The third matching execution module 102C executes the third matching with use of the item titles in the online shopping service as the third dictionary data D3. Of the tokens included in the search query, tokens that have not fully matched in the first matching and the second matching are subjected to the third matching. The third matching is different from the matching described in the first embodiment in that the third dictionary data D3 is used, and in that the tokens that have not fully matched in the first matching and the second matching are subjected to the third matching, but specific processing per se of the third matching is similar to the matching described in the first embodiment.

The third dictionary data D3 used in the third matching may be the third dictionary data D3 corresponding to the item genre determined by the determination module 108. In this case, it is assumed that, for each item genre, the third dictionary data D3 generated based on item titles of items that belong to the item genre has been prepared. The third matching execution module 102C executes the third matching based on the third dictionary data D3 corresponding to the item genre.

For example, Search Query 3 of FIG. 8 is a title of an anime that has recently become popular. When a character string that is the same as the title is stored in any one of the first dictionary data D1, the second dictionary data D2, and the third dictionary data D3, Search Query 3 finds a full match in any one of the first matching, the second matching, and the third matching. Consequently, Search Query 3 is extracted as an appropriate search query in any one of the first matching, the second matching, and the third matching.

In contrast, Search Query 5 of FIG. 8 partially matches but does not fully match with the title of the anime stored in any one of the first dictionary data D1, the second dictionary data D2, and the third dictionary data D3. Consequently, Search Query 5 is not extracted in the first matching, the second matching, and the third matching. Tokens 5-1 to 5-3 included in Search Query 5 are combined based on collocation scores obtained by a collocation score acquisition module 103, which is to be described below.

[Collocation Score Acquisition Module]

The collocation score acquisition module 103 includes a first collocation score acquisition module 103A and a second collocation score acquisition module 103B. In the second embodiment, description is given of a case in which the first collocation score acquisition module 103A executes processing prior to the second collocation score acquisition module 103B, but the second collocation score acquisition module 103B may execute processing prior to the first collocation score acquisition module 103A.

The first collocation score acquisition module 103A acquires a first collocation score on relation of a plurality of tokens before being divided by morphological analysis. As the morphological analysis per se, various known tools can be used, and a tool called MeCab or JUMAN can be used, for example. For a search query in a language other than Japanese, it is only required that a morphological analysis tool corresponding to the language be used.

By the morphological analysis, a token included in the search query is divided into morphemes, which are smallest units in the language. Description is given of a case in which the morphological analysis is executed by the dividing module 109, but the morphological analysis may be executed by another functional block. Processing of the first collocation score acquisition module 103A is similar to the processing of the collocation score acquisition module 103 described in the first embodiment, and the first collocation score is similar to the collocation score described in the first embodiment.

The second collocation score acquisition module 103B acquires a second collocation score on suffixes or prefixes based on the morphemes obtained as a result of the division by the morphological analysis. For example, the dividing module 109, which is to be described later, executes the morphological analysis on tokens included in the search query. The morphological analysis may be executed on all tokens in the search query acquired by the search query acquisition module 101, or the morphological analysis may be executed on tokens forming a part of the search query acquired by the search query acquisition module 101. In the second embodiment, it is assumed that the morphological analysis is executed on tokens that have not been extracted after the third matching is executed.

The second collocation score is information indicating whether a plurality of morphemes have a relationship of a suffix and a preceding morpheme, or a plurality of morphemes have a relationship of a prefix and a subsequent morpheme. As a method of acquiring the second collocation score per se, a known method can be used. For example, a method involving using the dictionary data D in which at least one of suffixes or prefixes is registered may be used. In this case, the second collocation score of a morpheme that fully matches with a suffix defined in the dictionary data D and a preceding morpheme is high. The second collocation score of a morpheme that fully matches with a prefix defined in the dictionary data D and a subsequent morpheme is high.

For example, Token 1 is divided into a morpheme constituted of Character 1-1 and Character 1-2 and a morpheme constituted only of Character 1-3 by the morphological analysis. Character 1-3 is one of suffixes, and hence has a high second collocation score among those words. Although not illustrated in the example of FIG. 8, when a suffix is obtained as a morpheme as a result of the division, the morpheme and a subsequent morpheme also have a high second collocation score. The other tokens of FIG. 8 do not include a suffix or a prefix, and hence second collocation scores thereof are not very high.

A method of calculating the first collocation score is hereinafter referred to as a first calculation method, and a method of calculating the second collocation score is hereinafter referred to as a second calculation method. It is assumed that the first calculation method has a higher matching rate in the past than that of the second calculation method. The meaning of the matching rate in the past is as described for the dictionary data D. The first collocation score acquisition module 103A acquires a first collocation score using the first calculation method having a relatively higher matching rate in the past based on the plurality of tokens. The second collocation score acquisition module 103B acquires a second collocation score using the second calculation method having a relatively lower matching rate in the past based on tokens of the plurality of tokens for which the first collocation score is less than a threshold value.

[Output Acquisition Module]

An output acquisition module 104 is similar to that of the first embodiment.

[Chunking Execution Module]

The chunking execution module 105 executes chunking based on the result of executing the matching with use of the plurality of sets of the dictionary data D, and an output from the learning model M. For example, the chunking execution module 105 may execute the chunking based on the result of executing the first matching, the result of executing the second matching, and the output from the learning model M. A method of executing the chunking based on the results of executing the individual matchings is similar to that of the first embodiment, and the chunking execution module 105 determines that the matched tokens are not to be chunked.

For example, the chunking execution module 105 may execute the chunking based on the result of executing the matching, the output from the learning model M, the first collocation score, and the second collocation score. A method of executing the chunking based on each individual collocation score is similar to that of the first embodiment. For example, the chunking execution module 105 executes the chunking so that tokens for which the first collocation score is the threshold value or more are combined to form one token. The chunking execution module 105 executes the chunking based on the first collocation score so that related tokens form one token.

The second collocation score is the information on suffixes or prefixes, and the chunking execution module 105 may execute the chunking based on the second collocation score so that a suffix and a preceding morpheme form one token, or a prefix and a subsequent morpheme form one token. The chunking execution module 105 executes the chunking based on the second collocation score so that a suffix and a preceding morpheme form one token, or a prefix and a subsequent morpheme form one token. In other words, the chunking execution module 105 executes the chunking so that morphemes for which the second collocation score is the threshold value or more are combined into one token.

The chunking execution module 105 may execute the chunking by dividing a token indicated to be divided by the division necessity information, which is acquired by the output acquisition module 104, with use of the dictionary data D. In the second embodiment, description is given of a case in which the first dictionary data D1 is used, but the chunking execution module 105 may divide the token with use of the second dictionary data D2 or the third dictionary data D3. When the division necessity information indicates that a token is to be divided, the chunking execution module 105 determines whether the token and the first dictionary data D1 partially match. When a word that partially matches the token exists in the first dictionary data D1, the chunking execution module 105 divides the token to include a token constituting of the word and a token constituting of the other part.

The chunking execution module 105 may execute the chunking based on the result of executing the matching, the output from the learning model M, and the item genre. In the second embodiment, the chunking execution module 105 executes the chunking based on the third dictionary data corresponding to the item genre that has been determined by the determination module 108. The chunking execution module 105 causes the third matching execution module 102C to execute the third matching based on the third dictionary data corresponding to the item genre, and executes the chunking based on a result of executing the third matching. A token that fully matches in the third matching is not subjected to the chunking.

[Search Processing Execution Module]

A search processing execution module 106 is similar to that of the first embodiment.

[Presentation Module]

A presentation module 107 is similar to that of the first embodiment.

[Determination Module]

The determination module 108 determines the item genre corresponding to the search query. The item genre is information used to classify an item. The item genre is sometimes also called an item category. The item genre is one of attributes of the item. The phrase "item genre corresponding to the search query" refers to an item genre associated with the search query. For example, when the search query includes an item genre, the item genre included in the search query is the item genre corresponding to the search query. When an item genre is attached to the search query, the item genre attached to the search query is the item genre corresponding to the search query.

In the second embodiment, it is assumed that the user specifies the item genre. For example, the user terminal 20 transmits the item genre specified by the user from the top page P2, for example, together with the search query to the server 10. The server 10 receives the item genre and the search query from the user terminal 20. The determination module 108 determines the item genre by acquiring the item genre received from the user terminal 20. The user does not specify an item genre in some cases, and in those cases, the processing of the determination module 108 is omitted.

A method of determining the item genre is not limited to the above-mentioned example. The determination module 108 may determine the item genre based on a token included in the search query. In this case, relationships between character strings that can be included in tokens and item genres are defined in the data storage unit 100. For example, an item genre "electric appliances" is associated with character strings of manufacturer names and item names. In addition, for example, an item genre "clothing" is associated with character strings of brand names and sizes. When a character string defined in the above-mentioned relationships is included in a search query, the determination module 108 determines an item genre corresponding to the search query by acquiring an item genre associated with the character string.

[Dividing Module]

The dividing module 109 divides at least one token included in the search query based on the morphological analysis. The dividing module 109 divides the token included in the search query into morphemes based on the known tool described above. As the morphological analysis tool, various known tools can be used as described above. In the case of the example of FIG. 8, Token 1 is divided into a morpheme consisting of Character 1-1 and Character 1-2, and a morpheme consisting of Character 1-3. Tokens 2-1 and 2-2 are not divided any further. Token 3 is divided into a morpheme consisting of Character 3-1 and Character 3-2, a morpheme consisting of Character 3-3, and a morpheme consisting of Character 3-4. Token 4 is divided into a morpheme consisting of Character 2-1 to Character 2-4, and a morpheme consisting of Characters 2-5 and 2-6. Tokens 5-1 to 5-3 are not divided any further. It should be noted, however, that in the second embodiment, all tokens are not always subjected to the morphological analysis, and hence the morphological analysis is executed only on tokens subjected to the morphological analysis.

[2-3. Processing Executed in Second Embodiment]

Figure 10:
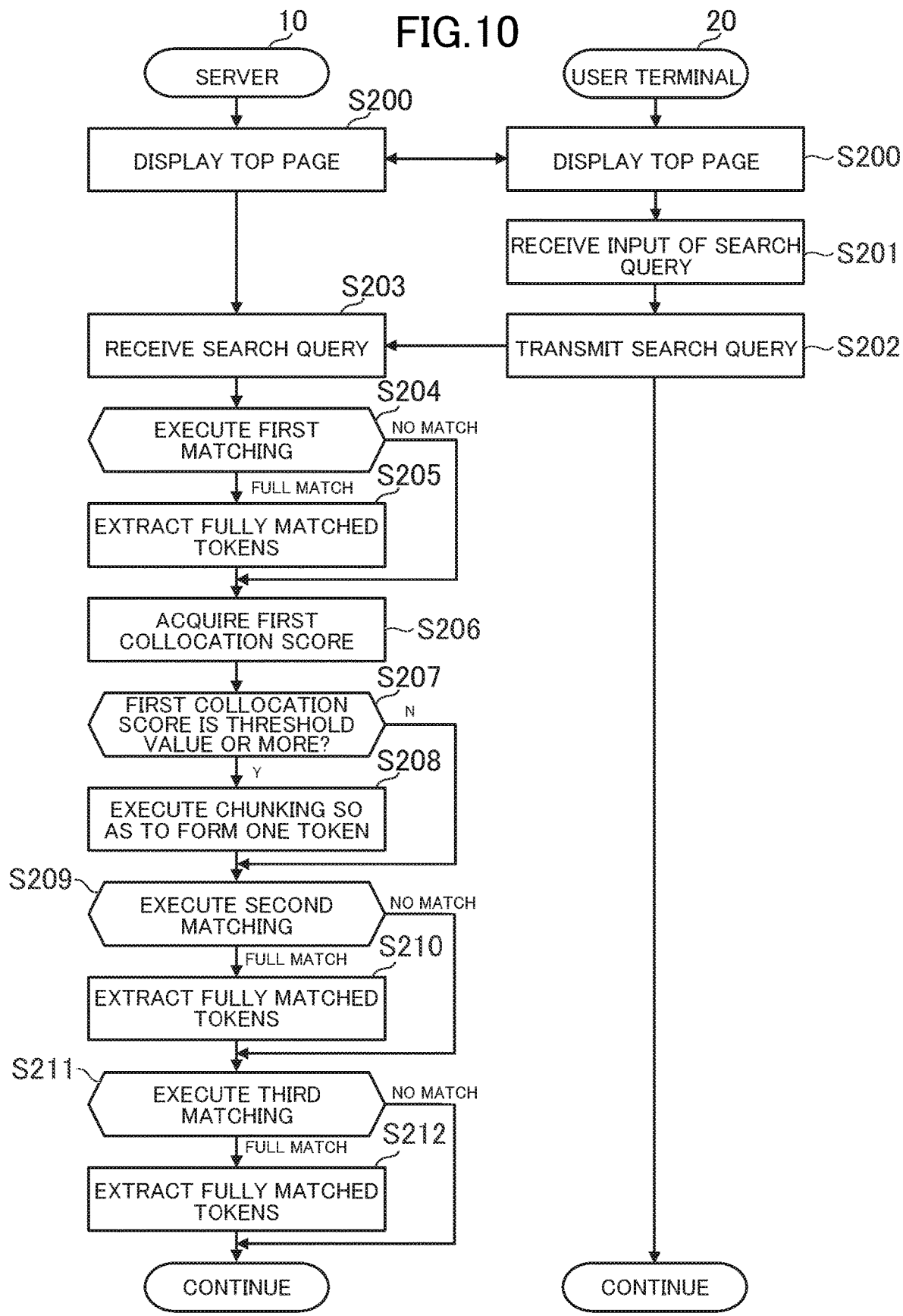
FIG. 10 is a flow chart for illustrating an example of processing executed in the second embodiment.
Figure 11:
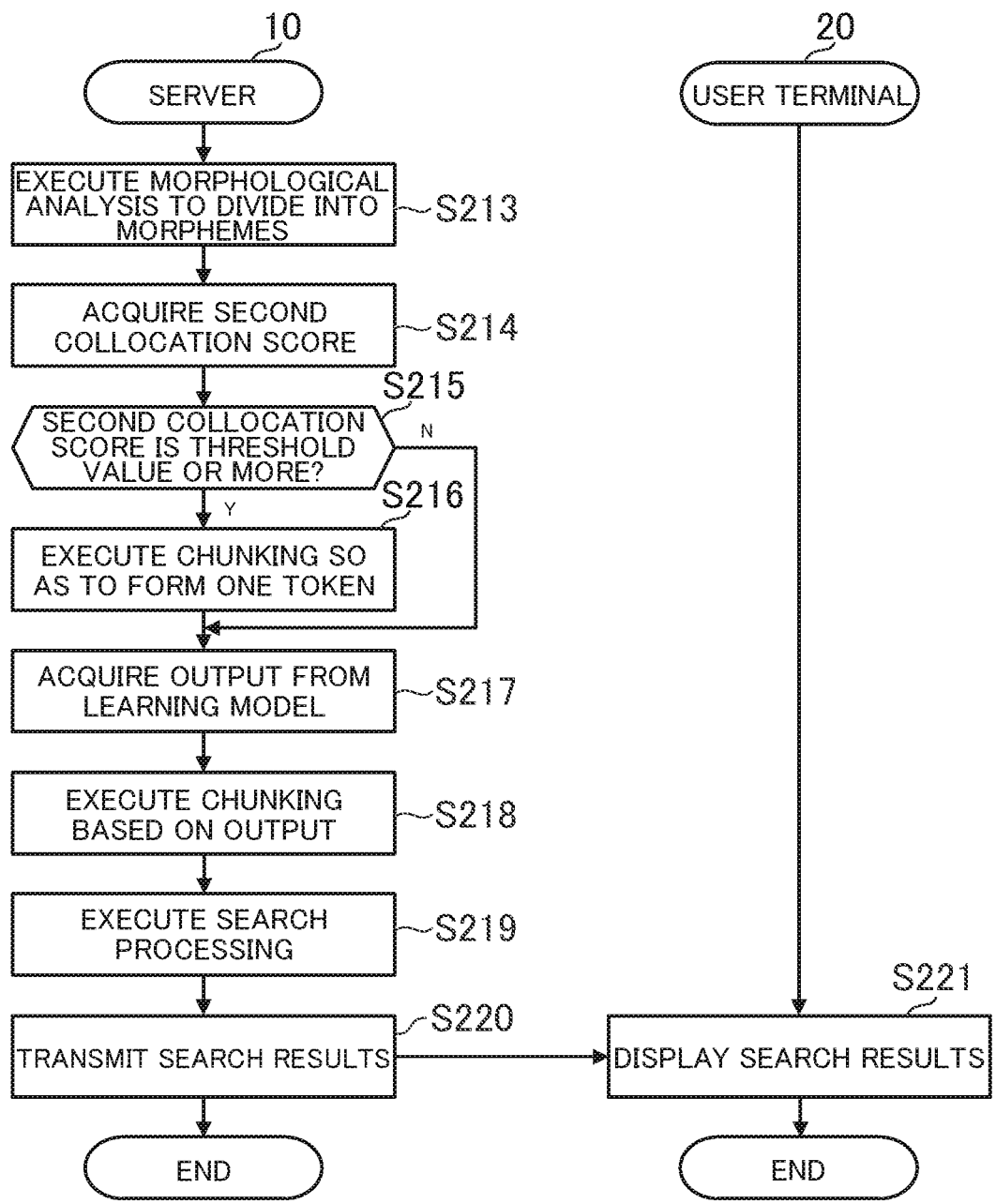
FIG. 11 is a flow chart for illustrating the example of processing executed in the second embodiment.

FIG. 10 and FIG. 11 are flow charts for illustrating an example of processing executed in the second embodiment. This processing is executed by the control units 11 and 21 operating in accordance with programs stored in the storage units 12 and 22, respectively.

Processing steps of Step S200 to Step S203 is different from Step S100 to Step S103 in that the search query is input in the online shopping service, but is similar to the processing steps of Step S100 to Step S103 otherwise. Subsequent processing steps of Step S204 and Step S205 is different from processing steps of Step S104 and Step S105 in that the first dictionary data D1 is used, but is similar to the processing steps of Step S104 and Step S105 otherwise. Tokens that have not been extracted in the processing step of Step S205 of the search query are subjected to a processing step of Step S206.

Subsequent processing steps of Step S206 to Step S208 is different from processing steps of Step S106 to Step S108. Tokens that have not been extracted in the processing step of Step S208 of the search query are subjected to a processing step of Step S209. Subsequent processing steps of Step S209 and Step S210 is different from processing steps of Step S104 and Step S105 in that the second dictionary data D2 is used, but is similar to the processing steps of Step S104 and Step S105 otherwise. Tokens that have not been extracted in the processing step of Step S210 of the search query are subjected to a processing step of Step S211.

Subsequent processing steps of Step S211 and Step S212 is different from processing steps of Step S104 and Step S105 in that the third dictionary data D3 is used, but is similar to the processing steps of Step S104 and Step S105 otherwise. The third dictionary data D3 is included in the item category corresponding to the search query. The item category is determined in the processing step of Step S211. Tokens that have not been extracted in the processing step of Step S212 of the search query are subjected to a processing step of Step S213.

Referring next to FIG. 11, the server 10 executes the morphological analysis on the tokens that have not been extracted after the processing step of Step S212 (tokens remaining in the search query) to divide the tokens into morphemes (Step S213). The server 10 acquires the second collocation score on the suffixes or the prefixes based on the morphemes obtained as a result of the division in Step S213 (Step S214), and determines whether the second collocation score is the threshold value or more (Step S215). When it is determined that the second collocation score is the threshold value or more (Step S215: Y), the server 10 executes chunking so that a plurality of morphemes for which the collocation score is the threshold value or more form one token from the search query (Step S216).

Processing steps of Step S217 and Step S218 is similar to Step S109 and Step S110. It is not a morpheme obtained as a result of the division in Step S213 but a token in the search query that is input to the learning model M in the processing step of Step S217. In Step S218, when the division necessity information indicates that division is required, the server 10 divides one token into a plurality of tokens based on the first dictionary data D1. Processing steps of Step S219 to Step S221 is similar to Step S111 to Step S113.

The chunking execution system S according to the second embodiment executes the matching with use of a plurality of sets of the dictionary data D, and executes the chunking based on results of executing the matching with use of the plurality of sets of the dictionary data D and the output from the learning model M. As a result, as compared to a case in which only a single set of the dictionary data D is used, for example, a probability that tokens included in the search query can be formed into appropriate tokens is increased, and the chunking accuracy is increased.

The chunking execution system S executes, when some tokens of the plurality of tokens have found hits in the first dictionary data D1, the second matching based on tokens of the plurality of tokens that have failed in finding hits in the first dictionary data D1, and on the second dictionary data D2. As a result, when there is a token that is found in the first dictionary data D1 in the first matching, the number of tokens to be subjected to the second matching can be reduced, and hence a processing load on the server 10 is reduced. Unnecessary matching is not executed, and hence the processing can be increased in speed.

Further, in the chunking execution system S, the first matching based on the first dictionary data D1 having the relatively higher matching rate in the past is executed prior to the second matching based on the second dictionary data D2 having the relatively lower matching rate in the past. As a result, a probability of being capable of reducing the number of tokens to be subjected to the second matching is increased. Consequently, the processing load on the server 10 can be effectively reduced, and the processing can be further increased in speed.

Further, the chunking execution system S executes the chunking based on the second collocation score so that a suffix and a preceding morpheme form one token, or a prefix and a subsequent morpheme form one token. As a result, for example, what should basically be one token can be prevented from being erroneously decomposed by the learning model M, and the chunking accuracy is increased.

Further, the chunking execution system S executes the chunking based on the first collocation score so that related tokens form one token. The chunking execution system S executes the chunking based on the second collocation score so that a suffix and a preceding morpheme form one token, or a prefix and a subsequent morpheme form one token. As a result, related words can be combined into one token, and the chunking accuracy is increased.

Further, the chunking execution system S acquires a first collocation score using the first calculation method having a relatively higher matching rate in the past based on the plurality of tokens. The chunking execution system S acquires a second collocation score using the second calculation method having a relatively lower matching rate in the past based on tokens of the plurality of tokens for which the first collocation score is less than a threshold value. As a result, the number of tokens for which second collocation scores are to be acquired may be reduced in some cases, and the processing load on the server 10 is reduced. Unnecessary second collocation scores are not acquired, and hence the processing can be increased in speed.

Further, the chunking execution system S divides a token indicated to be divided by the division necessity information, with use of the first dictionary data D1, and executes chunking based on a result of executing the division with use of the first dictionary data D1. As a result, it can be determined whether to actually divide the token with use of the first dictionary data D1 specific to the online shopping service, and hence the chunking accuracy for the search query is effectively increased. For example, even when the learning model M is a general-purpose model that executes general word division instead of the online shopping service, the division of the token can be achieved with higher accuracy by using the first dictionary data D1 specific to the online shopping service.

Further, the chunking execution system S determines an item genre corresponding to the search query, and executes the chunking based on the result of executing the matching, the output from the learning model M, and the item genre. As a result, appropriate chunking with use of the item genre can be executed, and hence the chunking accuracy is effectively increased. For example, when the third dictionary data D3 corresponding to the item genre is used in the third matching, the number of words with which to compare in the third matching can be reduced, and the processing load on the server 10 can be reduced. Unnecessary matching is not executed, and hence the processing can be increased in speed.

Further, the chunking execution system S executes the matching with use of an item title in the online shopping service as the third dictionary data D3. As a result, the trouble of generating the third dictionary data D3 can be saved by diverting the item titles. Further, search accuracy in the online service is increased.

3. Modification Examples

The present disclosure is not limited to the embodiments described above, and can be modified suitably without departing from the spirit of the present disclosure.

For example, the above-mentioned modification examples may be combined. For example, the learning model M may estimate not the division necessity for an input token but combination necessity for input tokens. The learning model M may estimate the necessity of both of division and combination of input tokens. For example, the collocation score may not be used in chunking. Further, for example, the functions that have been described to be achieved in the server 10 may be achieved in another computer, or may be shared by a plurality of computers. For example, the data that has been described to be stored in the data storage unit 100 may be stored in a database server.

What is claimed is:

1. A chunking execution system, comprising at least one processor configured to:
   acquire a search query including at least one token;
   execute matching of words or phrases in the search query with corresponding words or phrases in a dictionary database;
   acquire an output from a learning model on chunking based on the search query; and
   execute chunking on the search query based on a result of executing the matching and the output from the learning model;
   wherein a result of the matching is determining if there is an exact or partial match of the words or phrases in the search query with corresponding words or phrases in the dictionary database;
   wherein the processor is configured to execute chunking by:
      extracting the words or phrases in the search query that have an exact or partial match in the dictionary database; and
      inputting the words or phrases in the search query that do not have an exact or partial match in the dictionary database which are not extracted into the learning model.

2. The chunking execution system according to claim 1, wherein the at least one processor is configured to:
   execute the matching based on the search query before processing of the learning model is executed; and
   acquire an output from the learning model based on the search query on which the matching has been executed.

3. The chunking execution system according to claim 1, wherein the at least one processor is configured to:
   execute the matching with use of a plurality of sets of a dictionary data in the dictionary database; and
   execute the chunking based on results of executing the matching with use of the plurality of sets of the dictionary data and the output from the learning model.

4. The chunking execution system according to claim 3, wherein the search query includes a plurality of tokens, wherein the plurality of sets of the dictionary data include a first dictionary data and a second dictionary data, and
   wherein the at least one processor is configured to:
      execute a first matching based on the plurality of tokens and the first dictionary data;
      execute, when some tokens of the plurality of tokens have found hits in the first dictionary data, a second matching based on tokens of the plurality of tokens that have failed in finding hits in the first dictionary data, and on the second dictionary data; and
      execute the chunking based on a result of executing the first matching, a result of executing the second matching, and the output from the learning model.

5. The chunking execution system according to claim 4, wherein the first dictionary data has a higher matching rate in a past than a matching rate of the second dictionary data, and
   wherein the first matching based on the first dictionary data having the relatively higher matching rate in the past is executed prior to the second matching based on the second dictionary data having the relatively lower matching rate in the past.

6. The chunking execution system according to claim 1, wherein the at least one processor is configured to:
   acquire a collocation score based on the search query; and
   execute the chunking based on a result of executing the matching, the output from the learning model, and the collocation score.

7. The chunking execution system according to claim 6, wherein the at least one processor is configured to divide the at least one token included in the search query into a plurality of morphemes based on morphological analysis,
   wherein the collocation score is information on one of suffixes and prefixes, and
   wherein the at least one processor is configured to execute the chunking based on the collocation score so that a suffix and a preceding morpheme form one token, or a prefix and a subsequent morpheme form one token.

8. The chunking execution system according to claim 7, wherein the search query includes a plurality of tokens, and
   wherein the at least one processor is configured to:
      acquire a first collocation score on a relation of the plurality of tokens before being divided by the morphological analysis;
      acquire a second collocation score on one of suffixes and prefixes based on the plurality of morphemes obtained by division by the morphological analysis;
      execute the chunking based on the first collocation score so that related tokens form one token; and
      execute the chunking based on the second collocation score so that a suffix and a preceding morpheme form one token, or a prefix and a subsequent morpheme form one token.

9. The chunking execution system according to claim 6, wherein the search query includes a plurality of tokens, and
   wherein the at least one processor is configured to:
      acquire a first collocation score using a first calculation method having a relatively higher matching rate in a past based on the plurality of tokens;
      acquire a second collocation score using a second calculation method having a relatively lower matching rate in the past based on tokens of the plurality of tokens for which the first collocation score is less than a threshold value; and
      execute the chunking based on a result of executing the matching, the output from the learning model, the first collocation score, and the second collocation score.

10. The chunking execution system according to claim 1, wherein the learning model is configured to output division necessity information regarding whether to divide the at least one token included in the search query, and
    wherein the at least one processor is configured to determine whether to divide a token included in the search query based on the division necessity information.

11. The chunking execution system according to claim 10, wherein the at least one processor is configured to execute the chunking by dividing a token which is indicated to be divided by the division necessity information, by using the dictionary database.

12. The chunking execution system according to claim 1,
wherein the search query is input at time of searching in an online shopping service, and
wherein the at least one processor is configured to:
determine an item genre corresponding to the search query; and
execute the chunking based on the result of executing the matching, the output from the learning model, and the item genre.

13. The chunking execution system according to claim 1,
wherein the search query is input at time of searching in an online shopping service, and
wherein the at least one processor is configured to execute the matching with use of an item title in the online shopping service as a dictionary data in the dictionary database.

14. The chunking execution system according to claim 1, wherein the at least one processor is configured to:
execute search processing based on a result of executing the chunking; and
present a result of executing the search processing to a user who has input the search query.

15. A chunking execution method, comprising:
acquiring a search query including at least one token;
executing matching of words or phrases in the search query with corresponding words or phrases in a dictionary database;
acquiring an output from a learning model on chunking based on the search query; and
executing chunking on the search query based on a result of executing the matching and the output from the learning model;
wherein a result of the matching is determining if there is an exact or partial match of the words or phrases in the search query with corresponding words or phrases in the dictionary database;
wherein executing chunking comprises:
extracting the words or phrases in the search query that have an exact or partial match in the dictionary database; and
inputting the words or phrases in the search query that do not have an exact or partial match in the dictionary database which are not extracted into the learning model.

16. A non-transitory information storage medium having stored thereon a program for causing a computer to:
acquire a search query including at least one token;
execute matching of words or phrases in the search query with corresponding words or phrases in a dictionary database;
acquire an output from a learning model on chunking based on the search query; and
execute chunking on the search query based on a result of executing the matching and the output from the learning model;
wherein a result of the matching is determining if there is an exact or partial match of the words or phrases in the search query with corresponding words or phrases in the dictionary database;
wherein the program causes the computer to execute chunking by:
extracting the words or phrases in the search query that have an exact or partial match in the dictionary database; and
inputting the words or phrases in the search query that do not have an exact or partial match in the dictionary database which are not extracted into the learning model.

17. The chunking execution system according to claim 6, wherein the at least one processor is configured to:
acquire the collocation score only for the words or phrases in the search query that do not have an exact or partial match in the dictionary database.

18. The chunking execution system according to claim 6, wherein the at least one processor is configured to:
determine whether to combine the words or phrases in the search query that do not have an exact or partial match in the dictionary database based on whether the collocation score is above a threshold value.

* * * * *